(12) United States Patent
Brémond et al.

(10) Patent No.: US 8,091,791 B2
(45) Date of Patent: Jan. 10, 2012

(54) METHOD AND DEVICE FOR CODING ARTICLES

(75) Inventors: Olivier Brémond, Prilly (CH); Thomas Tiller, Bussigny (CH); Myron Seto, Lausanne (CH)

(73) Assignee: SICPA Holding SA, Prilly (CH)

( * ) Notice: Subject to any disclaimer, the term of this patent is extended or adjusted under 35 U.S.C. 154(b) by 915 days.

(21) Appl. No.: 10/519,452

(22) PCT Filed: May 16, 2003

(86) PCT No.: PCT/EP03/05149
§ 371 (c)(1),
(2), (4) Date: Dec. 29, 2004

(87) PCT Pub. No.: WO2004/006163
PCT Pub. Date: Jan. 15, 2004

(65) Prior Publication Data
US 2006/0150851 A1    Jul. 13, 2006

(30) Foreign Application Priority Data
Jul. 8, 2002 (EP) .................... 02015186

(51) Int. Cl.
| G06K 19/06 | (2006.01) |
| G06K 19/00 | (2006.01) |
| G06K 7/016 | (2006.01) |
| G06K 7/10 | (2006.01) |
| G06K 7/14 | (2006.01) |
| G06K 5/00 | (2006.01) |
| G06K 7/00 | (2006.01) |
| B41J 11/44 | (2006.01) |
| B41F 33/00 | (2006.01) |
| B41F 31/00 | (2006.01) |
| H04N 1/40 | (2006.01) |

(52) U.S. Cl. ........ 235/494; 101/483; 101/484; 101/491; 400/76; 358/3.29; 358/3.31; 235/487; 235/474; 235/435; 235/437; 235/454

(58) Field of Classification Search .................. None
See application file for complete search history.

(56) References Cited

U.S. PATENT DOCUMENTS

| 3,955,502 A | * | 5/1976 | Von Hofe ................... 101/484 |
| 4,587,411 A | * | 5/1986 | Obstfelder et al. ........... 235/437 |
| 4,734,713 A | * | 3/1988 | Sato et al. .................... 347/171 |
| 4,860,226 A | * | 8/1989 | Martin et al. .................. 702/82 |
| 4,864,618 A | * | 9/1989 | Wright et al. ................... 380/51 |

(Continued)

FOREIGN PATENT DOCUMENTS

DE    10012361    9/2001

(Continued)

*Primary Examiner* — Daniel Walsh
(74) *Attorney, Agent, or Firm* — Greenblum & Bernstein, P.L.C.

(57) ABSTRACT

The invention is about a marking method and a corresponding coding center device for the marking of individual items (1), such as security documents, currency, tax excise stamps, labels, pieces of packaging, articles, or transportation means, with pertinent information indicating their nature and/or content, origin and/or destination, etc., and their registration in a remote, centralized data base, enabling the tracking & tracing of said items (1) and of the goods they may be applied to. The method of the invention is based on a three-step printreadcancel (PRC) sequence, embodied in a device comprising a printing unit (P), a reading unit (R) and a canceling unit (C), arranged in-line on an integrated equipment and operating under the control of information processing means (IP).

20 Claims, 2 Drawing Sheets

U.S. PATENT DOCUMENTS

Figure 1:
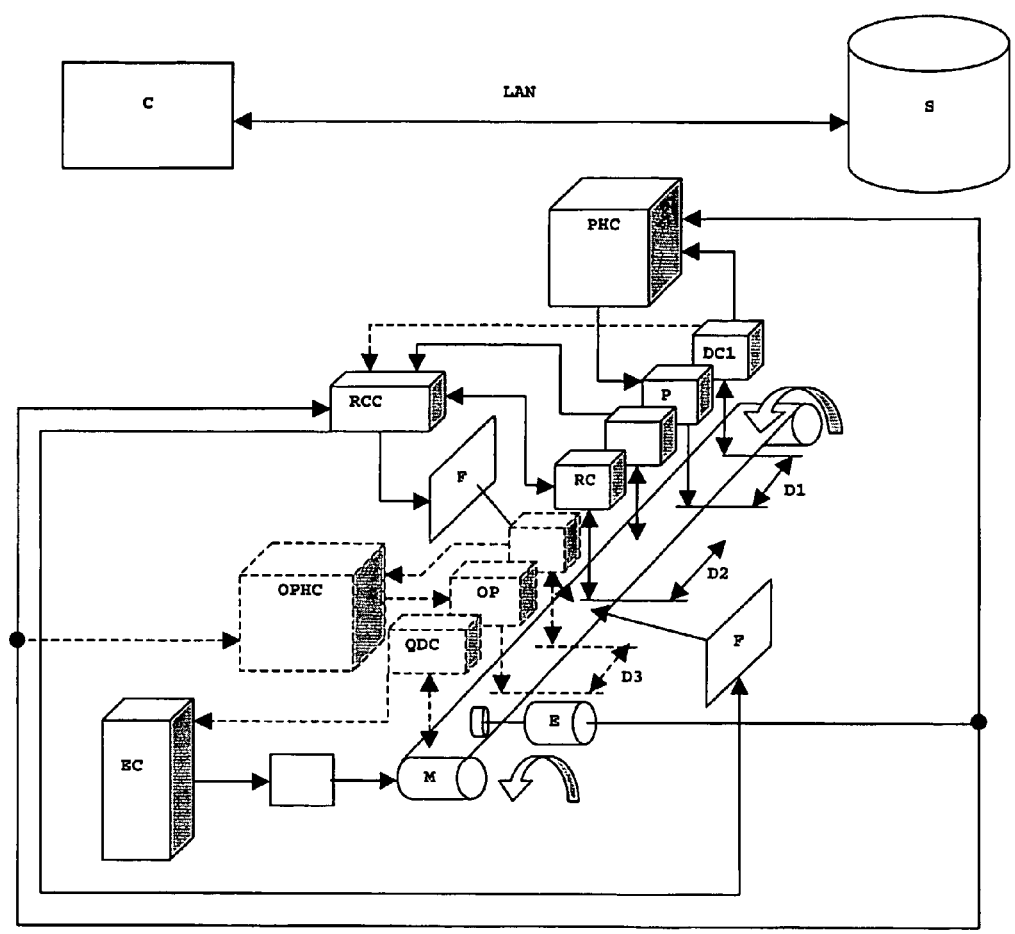

| | | | |
|---|---|---|---|
| 4,916,294 A | | 4/1990 | Goldman |
| 5,285,384 A * | | 2/1994 | Gineris ............................ 705/31 |
| 5,286,286 A * | | 2/1994 | Winnik et al. ............... 106/31.15 |
| 5,337,248 A * | | 8/1994 | Eckert et al. .................... 700/228 |
| 5,592,561 A * | | 1/1997 | Moore ............................ 382/103 |
| 5,731,880 A * | | 3/1998 | Takaragi et al. ............... 358/296 |
| 5,861,618 A * | | 1/1999 | Berson ........................... 235/468 |
| 5,945,655 A * | | 8/1999 | Gilgeous et al. ............... 235/454 |
| 6,002,844 A * | | 12/1999 | Kishida et al. ............... 358/1.15 |
| 6,085,182 A * | | 7/2000 | Cordery ......................... 705/408 |
| 6,644,764 B2 * | | 11/2003 | Stephens, Jr. ....................... 347/3 |
| 6,854,904 B2 * | | 2/2005 | Oshino et al. .................. 400/103 |
| 6,905,538 B2 * | | 6/2005 | Auslander .................... 106/31.15 |
| 6,985,607 B2 * | | 1/2006 | Alasia et al. ................... 382/112 |
| 7,182,259 B2 * | | 2/2007 | Lubow et al. ............ 235/462.01 |
| 7,264,169 B2 * | | 9/2007 | Juds ............................... 235/468 |
| 7,270,491 B2 * | | 9/2007 | Oda et al. ......................... 400/76 |
| 7,757,952 B2 * | | 7/2010 | Tuschel et al. ................. 235/440 |
| 2001/0031163 A1 * | | 10/2001 | Oshima et al. .................. 400/73 |
| 2001/0050010 A1 * | | 12/2001 | Buch et al. ..................... 101/211 |
| 2002/0063744 A1 * | | 5/2002 | Stephens, Jr. ..................... 347/19 |
| 2002/0065728 A1 * | | 5/2002 | Ogasawara ...................... 705/23 |
| 2002/0070282 A1 * | | 6/2002 | Gotoh et al. ................... 235/494 |
| 2002/0158137 A1 * | | 10/2002 | Grey et al. ..................... 235/494 |
| 2003/0080191 A1 * | | 5/2003 | Lubow et al. ............ 235/462.01 |
| 2003/0106985 A1 * | | 6/2003 | Fagin et al. .................. 250/208.1 |
| 2003/0227528 A1 * | | 12/2003 | Hohberger et al. ........... 347/104 |
| 2004/0001133 A1 * | | 1/2004 | Critelli et al. .................. 347/101 |
| 2004/0057768 A1 * | | 3/2004 | Oshino et al. ................. 400/103 |
| 2004/0123771 A1 * | | 7/2004 | Auslander .................. 106/31.15 |
| 2004/0253419 A1 * | | 12/2004 | Bleikolm et al. ........... 428/195.1 |
| 2005/0178841 A1 * | | 8/2005 | Jones et al. .................... 235/468 |
| 2005/0189420 A1 * | | 9/2005 | Chen et al. ............... 235/462.01 |
| 2005/0230960 A1 * | | 10/2005 | Bilodeau et al. ................. 283/75 |
| 2006/0072778 A1 * | | 4/2006 | Harrington .................. 382/100 |
| 2006/0088353 A1 * | | 4/2006 | Oda et al. ......................... 400/76 |
| 2006/0150851 A1 * | | 7/2006 | Bremond et al. ............. 101/484 |
| 2007/0152032 A1 * | | 7/2007 | Tuschel et al. ................. 235/375 |
| 2007/0241177 A1 * | | 10/2007 | Tuschel et al. ................. 235/375 |

FOREIGN PATENT DOCUMENTS

| | | | |
|---|---|---|---|
| EP | 0997837 | | 5/2000 |
| FR | 2754371 | | 4/1998 |
| GB | 2240510 | | 8/1991 |
| GB | 2278002 | | 11/1994 |
| JP | 63007955 | * | 1/1988 |
| JP | 02202465 | * | 8/1990 |
| JP | 4-78551 | | 3/1992 |
| JP | 04078551 A | * | 3/1992 |
| JP | 05-143767 | | 6/1993 |
| JP | 7-57027 | | 3/1995 |
| JP | 07262294 | * | 10/1995 |
| JP | 08-245060 | | 9/1996 |
| JP | 08-268420 | | 10/1996 |
| JP | 09-290538 | | 11/1997 |
| JP | 11-235871 | | 8/1999 |
| JP | 2002-150211 | | 5/2002 |
| WO | WO95/13597 | | 5/1995 |

\* cited by examiner

METHOD AND DEVICE FOR CODING ARTICLES

The invention concerns a method of marking which is particularly suited for the failure-free tracing of commercial goods or value documents along a distribution chain.

Efficient technology for tracing of commercial goods and value documents is very important in a global economy, where the ease of movement of persons and goods is a vital issue. As to its practical aspects, the efficient tracing of a document or an item calls for a number of different technical issues to be individually solved and assembled together to an integrated system. A tracking system noteworthy requires:
(a) the marking of the individual items to be tracked with information which is pertinent to their nature and origin;
(b) the possibility of on-site machine-reading/authentication of the marking information contained on said items;
(c) the possibility of transfer of the retrieved marking information to a remote data base;
(d) the possibility for remote treatment of the retrieved data at a central data base.

Certain elements of the required technology are already available in the art and have been used in similar contexts. This holds in particular for the equipment used to read the marking information, for the telecommunication means used to transfer the information from and to a remote data base, and for the data base and its management itself.

U.S. Pat. No. 5,918,910 deals with the marking and tracing of individual items in the aim to avoid confusion upon shipping and unpacking of a plurality of packed items. The system is based on a framed multi-part label, which carries the complete product information printed or encoded on each of its parts. In particular, the label carries information concerning the machine at which the labeled product is to be installed. After transporting the labeled product to the machine, at least one part of the label is removed from the product and compared with the identifying information of the machine.

U.S. Pat. No. 5,725,253 and U.S. Pat. No. 5,607,187 deal with an identification system, involving the labeling and tracking of grouped items such as logs, shipping containers, or packets of mail, and reporting the current location of identified items during transport, processing and storage. The product information is preferably a machine-readable, redundant (with particular reference to Latin Squares) visible code, which is read and verified by image-processing means. The image-processing means can hereby be on-site or remote.

U.S. Pat. No. 4,857,716 deals with a patient identification and verification system and corresponding method, for hospitals and related applications. The system includes a central computer containing a central data base, interconnected to a plurality of remote terminals by conventional telephone lines. The system further includes portable bar code reading devices including a bar code wand, an LCD display and a key pad. The portable bar code reading device communicates via RF transmission, modem and telephone line with the central computer, and is enabled to read patient identification bracelets, as well as identification labels attached to the various items used in the hospital. The retrieved information is automatically transmitted to the central data base, where it is correlated and stored appropriately.

None of the systems of the prior art has, however, addressed the specific technical problems and requirements which are connected with the tracing of authorization and liability items. In particular, security documents, currency, tax excise stamps, authorization labels, liability or warranty items, as well as the tracing of commercial goods, require (i) the capability of being authenticated, and (ii) 100% readability of the contained information. To enhance the document's or item's protection against counterfeiting attempts, the relevant information is furthermore (iii) preferably printed in a covert manner, i.e. invisible to the unaided human eye.

The above-mentioned requirements, in particular the requirement of 100% readability (no false negatives), calls for particular solutions, which are not provided up to now in the prior art. It is the object of the present invention to provide a method for the marking of individual items, such as security documents, currency, tax excise stamps, authorization labels, liability or warranty items, as well as particular commercial goods, which guarantees the capability of the printed information of being authenticate-able, a close to 100% readability through posterior validation, and allows as well for the covert application of the marking information, if desired.

It is a further object of the invention to provide a 'coding center' device embodying said method of marking, as well as enabling for the corresponding tracking & tracing of the marked documents or items through their registering in a centralized data base, using a data communication link.

These and further objects are solved by a marking method and a corresponding device as defined in the independent claims.

The method of marking according to the present invention noteworthy comprises the following steps:
a) Providing information to be applied to an item. Said information may be provided from any kind of source or generating means, such as a memory, a processor comprising a generating algorithm, or a data link to a remote server;
b) Applying a first marking, corresponding to said information provided, to the item. Said first marking may be applied to the item in any way, but preferably it is applied by a non-contact printing method such as ink-jet printing or laser marking, which allow for a rapid and flexible continuous marking operation;
c) Reading said first marking and information applied to said item in step b) and comparing it with the original information provided in step a);
d) Applying a second marking to said item if the first marking read in step c) does not correspond to the information provided in step a);
e) optionally, affixing said item to a carrier or a transportation substrate prior to marking. This allows high-speed in-line processing of a plurality of items, such as stamps, labels, banderoles, small goods or packages and the like which are carried through the process on a carrier or transportation substrate, e.g. a band or sheet of carrier material. This also allows easy handling before and after marking. Applying labels, banderoles, stamps and the like after marking to goods results in indirect marking of any kind of voluminous or otherwise difficult to handle objects.

The steps of providing information, applying a first marking corresponding to the provided information, reading said first marking and information, and applying a second marking if said read information does not correspond to said information provided are carried out as a continuous operation on an equipment which is capable to perform these steps under the control of an electronic processor.

The initial marking may noteworthy be applied by printing, preferably of the non-impact type or by laser marking, but also by impact printing, embossing or punching, heating or transfer printing devices etc.

The reading of the information may rely on conventional opto-electronic means, such as a photocell (for reading a linear barcode), but also on a photocell array (for array barcodes) or on an electronic camera coupled to image processing means.

Preferably the information is applied in the form of a machine-readable code, such as a barcode, a number or other one- or more-dimensional codes.

In the second marking step, the original information on the item may be destroyed, e.g. by overprinting the first marking, or the second marking may simply be added to the item. The goal of the second marking is to declare the item as invalid in an intrinsic way, i.e. to prevent its later use. This can be performed by applying, e.g. printing something on it, as well as by taking something away of it, e.g. by mechanically or chemically or otherwise altering the item. As the second marking has the object of "canceling" the validity of the originally applied information—and, thereby, the marked item—the corresponding step is described in this specification as "canceling".

If the first marking, i.e. the application of the information, is performed by printing, the second marking is preferably also done by printing, more preferably by overprinting the original information or marking.

The comparison step can be performed in a known way using an information processing device. The output of said device may be used to initiate the canceling step if the provided and printed information do not correspond.

The pertinent information may be applied by printing onto the item, which may be a document, a piece of currency, a tax stamp, a label, a piece of packaging, an article, a transportation means etc. The information, which is preferably a customized information, may be printed using any of the known printing or application techniques, but in the context of the present invention, particular consideration is given to the 'variable-information-printing' techniques, such as ink-jet printing, toner-based printing or laser-marking, etc. The information to be applied or printed can be customized on-line, locally and/or remote, and applied to the item in question. In a preferred embodiment, said information is generated in a remote data base and transmitted to the 'coding center'. The information can furthermore be encrypted, or it may carry an encrypted part (such as a digital watermark), as known to the man skilled in the art. The printing medium (ink, toner, base-coating for laser-marking e.g. by heat marking or abrasion) preferably contains at least one material-based security element, and the marking, in the case of ink-jet printing, is preferably chosen covert, i.e. not visible to the unaided eye. Covert markings and one material-based security elements are e.g. based on luminescent materials, magnetic materials, UV-absorbers, IR-absorbers, etc.

The second step of the sequence, the reading, follows the application or printing step, preferably immediately after the first step has been carried out. It serves as a quality control, which is particularly required if a variable-information printing technique is employed in the printing step, and as close as possible to 100% reliability of the final product has to be achieved. The reading step is carried out by the appropriate means, corresponding to the nature of the information printed in the first step. If the information printed in the first step is a linear barcode, a simple photocell assembly, such as used in barcode readers, will be the technology of choice. Multi-array barcodes will call for multi-photocell-array assemblies; more complex printed patterns, such as matrix codes, will require camera and image-processing means. The information read from the marking in the second step is decoded and compared with the information which should have been printed in the first step.

If a misfit between read and should-have-printed information is detected, it triggers the third step of the sequence, the in-line canceling operation. The canceling is performed by a canceling station, which applies a canceling mark to the item in question, which may be a label, a tax banderole, a piece of packaging, etc. Preferably, an ink-jet station is used for the canceling operation, and the item's invalidity is indicated by a printing in vividly colored ink, comprising preferably also a machine-readable component, such as a luminescent. This enables a subsequent automated application of the valid items onto e.g. commercial goods to be marked.

The 3-step in-line printing-reading-canceling sequence of the present invention allows noteworthy to exclude all items carrying a printing error, and to achieve therefore a close to 100% readability of the produced markings, even if they are produced with variable-information-printing techniques. This is of particular importance in the field of liability issues, where only correctly printed items, e.g. part labels, are retained in the central data base, or in the case of tax excise stamps, where only correctly printed stamps are charged to the customer.

The invention discloses furthermore a coding center device embodying the above-described print-read-cancel (PRC) sequence method. The coding center is laid out such as to operate at high throughput speed, and combines, in-line with a first printing station, which is preferably an ink-jet printing station, a control reading station, which is preferably based on camera and image processing means, followed by a second printing station for performing the canceling operation, if required. The second printing station is preferably an ink-jet printing station, too. The coding center embodying the PRC method is characterized in that the items to be marked are moved on a same conveyor train across the three stations of the PRC sequence, and that the verification (control reading) of the printed marking and the canceling operation, in case it is required, can be performed at full printing speed. The coding center embodying the PRC method further comprises the required digital processing means for assigning the variable information to the printing station, analyzing and comparing the control reading, and initiating the canceling operation in case it is required. Said processing means are preferably enabled as well for the book-keeping of the successfully printed items, e.g. by logging them on a central data base.

The items marked by the 'coding center' may themselves be liability items, such as currency or ID-documents, or they may serve to confer liability to another item, such as a piece of pharmaceutical packaging, warranting its content, a label affixed to a spare part, certifying its origin, or a seal for an official document, standing for its genuineness. Finally the marking may also be applied to selected commercial items, as well as to transportation means, directly, or by the means of packaging, labels, seals and the like, for mere tracking & tracing purposes. Such application can be of benefit for the study of market flows, as well as to fight diversion and parallel trade.

In the following, the present invention is further illustrated by reference to the accompanying drawings and non-limiting examples.

FIG. 1 shows the schematic diagram of an exemplary embodiment of the coding center device according to the present invention and embodying the method of the present invention.

Figure 2:
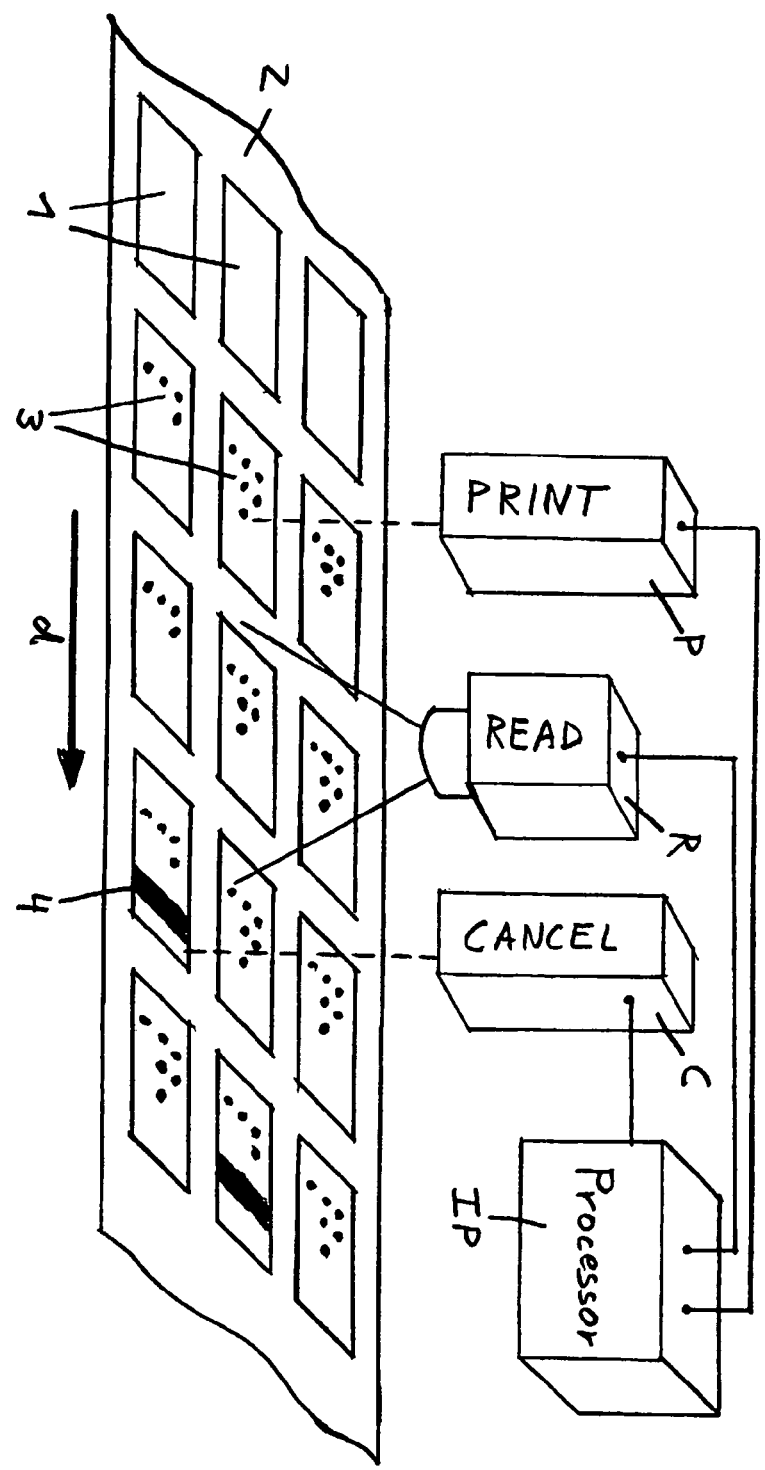

FIG. 2 shows a schematic diagram of performing a continuous in-line marking, reading and "canceling" sequence of items (1) under the control of a processor (IP): Items (1) on a conveyor (2), moving in direction (d), are imprinted at printing unit (P) with a first marking (3), which is read at reading unit (R). Items out-of-specification are imprinted at a canceling unit (C) with a canceling mark (4).

EXAMPLES

The coding center of a Track & Trace security system was implemented as a customer-designed unit, which was assembled from commercially available parts, as shown in FIG. 1. It comprises a moving web (W) with motor (M), along which are arranged in the moving direction which is indicated in FIG. 1 by an arrow: a first detector cell (DC1), a printing head (P) with printing head controller (PHC), a second detector dell (DC2), a reading camera (RC) with reading camera controller (RCC), a third detector cell (DC3), a canceling printing head (OP) with canceling printing head controller (OPHC), and a quality control detector cell (QDC). Further electrical units are required for the operation of the conveyer belt (an electrical cabinet (EC), a manual potentiometer (MP)), for the synchronization (encoder E), and for the illumination of the reading camera (flashlights F). The whole operation of the coding center is finally controlled by the system's Computer (C), which is connected to a central data base (Server (S)) via a Local Area Network (LAN) having a transmission rate of more than 500 kB/s. The printing head (P), the reading camera (RC) and the canceling printing head (OP) are disposed from the detector cells (DC1, DC2 and DC3) in a distance D1, D2, and D3, respectively, which is each sufficient to allow the control of the printing head (P), the reading camera (RC) and the canceling printing head (OP) by the signals generated by DC1, DC2, and DC3, respectively.

Generally, the method comprises the following process steps:
1) The codes to be printed are generated by the computer (C) (which may receive them from the external server (S)) and sent to the printing head controller (PHC).
2) The first detector cell (DC1), upon detecting an item on the conveyor belt, sends a signal to the printing head controller (PHC).
3) The printing head controller (PHC), using the pulses generated by the encoder (E), determines the actual conveyor speed, and prints the information received from the computer (C) at the appropriate place and extension on the item to be marked which is moved on the conveyor belt.
4) When the item is detected by the second detector cell (DC2), the reading camera controller (RCC), using the pulses generated by the encoder (E), determines the actual conveyor speed, and at the appropriate moment activates synchronous flashes (F) and the camera (RC), to capture a digital image frame of the previously printed information.
5) The reading camera controller (RCC) decodes the captured image frame, retrieving its information, e.g. its alphanumerical code, and sending it to the controlling Computer (C). The controlling Computer (C) compares the information read with the information generated initially. If the two match, the information is taken for validated and sent to the external server (S) to be stored there as "good". In the opposite case, the code may also be stored on the external server (S) but marked as "bad".
6) If the code is "bad", the controlling Computer (C) sends a signal to the canceling printing head controller (OPHC), to print a visible canceling mark. The printing of the canceling mark is performed by the canceling printing head (OP) and triggered by a signal from the third detector cell (DC3) and by the pulses generated by the encoder (E), determining the actual conveyor speed and the location where to apply the mark.
7) An optional quality control detector cell (QDC) at the end of the print-read-cancel chain can be used to check if the canceling mark was effectively applied on an item to be cancelled.

The process is in particular designed such as to cope with a varying conveyor speed. This requires the conveyor speed to be sensed by an encoder (E) and input into the different parts of the system, which need to calculate print locations and printing speeds, respectively. In this way, a variation of the conveyor speed will not influence the appearance of the printed information, and the coding center can simply be run up or shut down by the electrical controls of the main conveyor motor (M).

The process is implemented in the form of an operating program system, whose main part is running on the controlling Computer (C), with subsidiary parts running on the printing head controller (PHC), the reading camera controller (RCC), the canceling printing head controller (OPHC) and the remote data base (External Server).

In an exemplary embodiment according to the present invention, the coding center was designed as a 'narrow web' machine, of exterior dimensions (l×w×h) 2.1×1.5×1.5 m, running on a 220 V 50/60 Hz main power supply. It accepted roll paper for label applications, having a maximum width of 150 mm, and a paper weight ranging from 60 g/m$^2$ up to 100 g/m$^2$, conveyed at a choose-able speed range from 0 to 60 m/minute.

The detector cells were commercially available opto-electrical detectors of the type SICK reflex detector WT12-2, set up to detect the beginning of a label, or a specific mark on the roll paper.

The printing head controller was a commercially available DOMINO A-200 system, controlling a DOMINO continuous ink-jet printing head with electrostatic deflection. The same equipment is used for the canceling station.

As the reading camera and the reading camera controller, a DMxAUTOID-A1B2C2D3F012 system was used.

The controlling computer was embodied as a standard PC running at 500 MHz clock rate, and equipped with local area network (LAN) access and with the required number of serial ports. Four of them were used for controlling the coding center, to communicate i) with the printing head controller (PHC), ii) with the reading camera controller (RCC), iii) with the canceling printing head controller (OPHC), and iv) with the general machine interface in the electrical cabinet (EC), for enabling a totally automated operation of the coding center.

FIG. 2 shows labels (1) on a carrier band (2), moving in printing direction (d). Said labels are imprinted at a first ink-jet printing unit (P) with a first marking (3). Said marking, a 2-dimensional barcode, corresponds to information generated in processor (IP). The printed marking is subsequently read and decoded with the help of an electronic camera with built-in image processing facility (reading unit (R)). Processor (IP) compares the result of the reading operation with the information originally transmitted to printing unit (P). Items with printing errors are in this way detected and imprinted at a subsequent canceling ink-jet unit (C) with a canceling mark (4).

The marking 3 corresponds to information which is provided as described in connection with FIG. 1, and which may either vary from one item to another, or stay the same during certain series.

The technical embodiment comprises as well all those supplementary mechanical and electrical parts which are required for its proper functioning, such as known to the skilled in the art.

Based on the technical details of the present disclosure, the skilled man in the art will be able to realize other embodiments of the coding center, such as for 'wide web' printing, or for sheet-fed operation. He will also be able to combine the encoding center with supplementary operations, such as printing and converting operations, as well as automated label or seal application, or packaging operations, which may either precede or follow the coding operation as disclosed in the present invention.

The invention claimed is:

1. A method for marking an item, comprising the steps of:
a) providing information to be applied to the item;
b) applying a first marking to the item corresponding to the information provided in step a);
c) reading said first marking applied in step b) and comparing it with the information provided in step a);
d) applying a second marking to the item if the first marking read in step c) does not correspond to the information provided in step a);
wherein
said first marking, said reading of said first marking, said second marking are performed in a continuous process operated at a conveyor speed of the item for marking, and
said first marking is printed using an ink comprising a material-based security element selected from the group consisting of luminescent materials, UV absorbers and IR absorbers,
determining the conveyor speed of the item for marking; and
at least one of:
inputting the detected conveyor speed to a printer controller for applying the first marking in step b);
inputting the detected conveyor speed to a reader controller for reading the first marking applied in step b); and
inputting the detected conveyor speed to a printer controller for applying the second marking in step d).

2. Method according to claim 1, wherein said steps a) to d) are carried out in-line on an integrated equipment under the control of an electronic processor.

3. The method according to claim 1, wherein said second marking comprises the overprinting of said item with a cancellation mark.

4. The method according to claim 1, wherein said second marking is applied by a printing process.

5. The method according to claim 1, wherein said first marking and/or said second marking are applied by a non-contact printing method.

6. The method according to claim 5, wherein said non-contact printing method is selected from the group consisting of ink-jet printing and laser marking.

7. The method according to claim 1, wherein said first marking corresponding to said information is a bar code or a matrix code.

8. The method according to claim 1, wherein said information is encrypted, or carries an encrypted part.

9. The method according to claim 1, wherein said information is read by a device selected from the group consisting of a photocell assembly, a multi-photocell-array assembly and a camera coupled to image processor.

10. The method according to claim 1, wherein said information is generated on a remote server.

11. The method according to claim 1, wherein said second marking or canceling is applied by a non-contact printing method.

12. The method according to claim 11, wherein said non-contact printing method is ink-jet printing.

13. The method according to claim 12, wherein said ink-jet printing is performed with an ink containing a vividly colored substance.

14. The method according to claim 1, wherein said marking comprises a machine-readable component.

15. The method according to claim 1, wherein the marked item is affixed to an article or good to mark that article or good.

16. The method according to claim 9, further comprising confirming that the second mark was applied on an item having information that does not correspond to said information applied in step a).

17. A device for marking an item, comprising:
a) an information source for providing information to be applied to the item;
b) a first unit for applying a first covert marking to the item corresponding to information;
c) a reading unit for reading said first marking and the corresponding information on said item;
d) an electronic processor unit for comparing said information read in step b) with said information applied in step a);
e) a second unit for applying a second marking to said item if said information read in step c) does not correspond to said information applied in step a);
f) a conveyor speed detector for detecting the conveyor speed of the item; and
g) at least one of:
a printer controller structured and arranged to receive the detected conveyor speed and to control the first unit applying the first marking;
a reader controller structured and arranged to receive the detected conveyor speed and to control the reading of the first marking by the reading unit; and
a printer controller structured and arranged to receive the detected conveyor speed and to control the second unit applying the second marking,
wherein said first unit, said reading unit, and said second unit are arranged in-line to operate as a continuous process operated at a conveyor speed of the item, and said first marking is printed in covert using an ink comprising a material-based security element selected from the group consisting of luminescent materials, UV absorbers and IR absorbers.

18. The device according to claim 17, wherein said first unit, said reading unit, and said second unit are arranged in-line as an integrated equipment and operating under the control of an electronic processor.

19. The device according to claim 17, further comprising a quality control detector unit structured to confirm that the second mark was applied on an item having information that does not correspond to said information applied in step a).

20. The device according to claim 17, further comprising an encoder for determining the conveyor speed of the item for marking, wherein the encoder is coupled to said first unit, said reading unit, and said second unit so that a variation in conveyor speed does not influence an appearance of the printed information.

* * * * *

UNITED STATES PATENT AND TRADEMARK OFFICE
CERTIFICATE OF CORRECTION

PATENT NO. : 8,091,791 B2
APPLICATION NO. : 10/519452
DATED : January 10, 2012
INVENTOR(S) : O. Brémond et al.

It is certified that error appears in the above-identified patent and that said Letters Patent is hereby corrected as shown below:

IN THE CLAIMS:

At column 8, line 14 (claim 16, line 1) of the printed patent, please replace "Claim 9" with --Claim 1--.

Signed and Sealed this
Twenty-ninth Day of May, 2012

David J. Kappos
*Director of the United States Patent and Trademark Office*